Inventors
Maurice Bonnemay
Guy Bronoel
Denis Doniat

By Flit, Gipple & Jacobson
Attorneys

3,709,735
ELECTROCHEMICAL GENERATOR WITH
DISPERSE CARBON ELECTRODE
Maurice G. Bonnemay, Boulogne, Guy R. Bronoel,
Versailles, and Denis Doniat, Le Perreux, France, assignors to Agence Nationale de Valorisation de la
Recherche (Anvar), Puteaux, France
Filed Feb. 3, 1970, Ser. No. 8,328
Claims priority, application France, Feb. 4, 1969,
6902377
Int. Cl. H01m 29/04
U.S. Cl. 136—86 A                       11 Claims

ABSTRACT OF THE DISCLOSURE

The electrochemical generator has at least one electrochemical storage means having a rechargeable electrode whose active material is constituted by active carbon powder suspension in a liquid electrolyte. The suspension is circulated in contact with conducting grid elements. Under the effect of a charging voltage applied to the grid elements the electrolyte provides, by electrolytic decomposition, a fuel gas or an oxidising gas according to the sign of the rechargeable electrode. The compact electrode may be covered at least in part with a coating of porous polyvinyl chloride, whose pores are permeable to the electrolyte but not to the powdered material. The electrode plates may be of cadmium and the electrolyte of aqueous potassium hydroxide. A branch circuit may be provided for the circulating electrolyte and a reservoir of the powder material and filtration device for the electrolyte so that the disperse electrode may be replenished with fresh material.

---

The present invention relates to electrochemical generators, especially to electrochemical storage means of which at least one of the electrodes is constituted by a "disperse electrode," that is to say an electrode of which the material or active mass is constituted by a pulverulent material dispersed in the midst of a liquid electrolyte, the suspension thus obtained being adapted to be placed in circulation in contact with electrically conducting elements, especially through grids or the like, to restitute the energy which will have been previously storable in the particles of pulverulent material, at the moment of their contact with the electrically conductive elements operating thus as simple collectors.

There has already been described in the French Pat. No. 1,555,034 an accumulator of this type in which the active mass is constituted by pulverulent metallic materials. The charging of this accumulator is then effected by making the suspension of active mass circulate in contact with charging electrodes carried to a potential corresponding to the decomposition potential of the electrolyte in contact with the particles of the active mass, when the latter come into contact with this charging electrode. The decomposition of the electrolyte is accompanied then by the formation of a hydride or of an oxide of the disperse electrode, according as the latter is intended to constitute the cathode or the anode of the accumulator.

One of the difficulties inherent in such accumulators resides however in the necessity of using charging electrodes having, according to whether they co-operate with a cathodic or anodic active mass, a high oxygen or hydrogen over-potential relative to the corresponding overpotential of the active mass, so that the charging electrode is practically inert from the electrochemical point of view and decomposition of the electrolyte is only produced in contact with the active mass, when the latter encounter the charging electrode.

Reciprocally recourse is advantageously had to an inert discharge electrode having, according to the polarity of the corresponding mass, a slight oxygen or hydrogen over-potential. Consequently, the known accumulators of this type include in general in each of the cathodic or anodic compartments envisaged, on one hand, a charging electrode, on the other hand, a discharging electrode adapted to co-operate respectively with the same active mass.

According to the invention, it has been noted that the active metallic masses of the type in question, could be replaced, especially in cathodic compartments of these accumulators, by a pulverulent active carbon. It has in fact been discovered that the active carbon had a particularly low oxygen over-potential, so that the charging of the accumulator can be effected by means of any charging electrode, whatever the metal of which it is constituted.

According to the invention there is therefore provided an accumulator comprising at least one element of which the rechargeable electrode is characterized by the fact that it is constituted by a dispersion of pulverulent active carbon in the electrolyte, the suspension thus obtained being adapted to be placed in circulation in contact with electrically conductive elements, especially metallic grids or the like, the electrolyte being such that, under the effect of a charging voltage applied to the conductive elements, they are adapted to furnish by electrolytic decomposition a gas, especially oxygen, in contact with particles of the rechargeable electrode.

It has in fact been observed on the electrical charging of such an accumulator, that the particles of active carbon are, on their contact with the said conductive elements, brought to the same potential as the latter and that the electrolytic decomposition is then produced almost wholly in contact with these particles, the gaseous product of this electrolytic decomposition being then absorbed by the said particles. It is thus achieved that the almost totality of gaseous product by electrolytic decomposition is directly absorbed on the pulverulent active carbon. The oxygen absorbed on the particles of carbon is then adapted, on discharging of the accumulator, to come into action in the production of electrical current with a yield in the neighbourhood of 100%, at the moment of their encountering with a current collector which, in a preferred embodiment of the generator according to the invention, is constituted by conductive elements in contact with which the previous electrolytic absorption of oxygen has been effected on the particles of active carbon.

The invention comprises, apart from the preceding features, certain other features relating especially to the consitution of the said generator, which are preferably used at the same time, but which could if necessary be used separately, this generator being characterized by the fact that its electrode (or electrodes) of opposite sign to that of the disperse electrode is constituted by compact elements arranged in direct contact with the disperse electrode, preferably close to the abovesaid current collectors, these elements being constituted of cores or plates of rechargable material, such as cadmium, of which the active surfaces, at least in part not insulated, are covered with a porous coating enabling the access of the electrolyte to these surfaces and ionic conduction in the midst of its mass, but of which the pores have dimensions such that they prevent this access to the particles of pulverulent material of the disperse electrode.

In order that the invention may be fully understood, several embodiments of the electrochemical generator according to the invention are described below, purely by way of illustrative but non-limiting examples, with reference to the accompanying drawings, in which.

Figure 4:
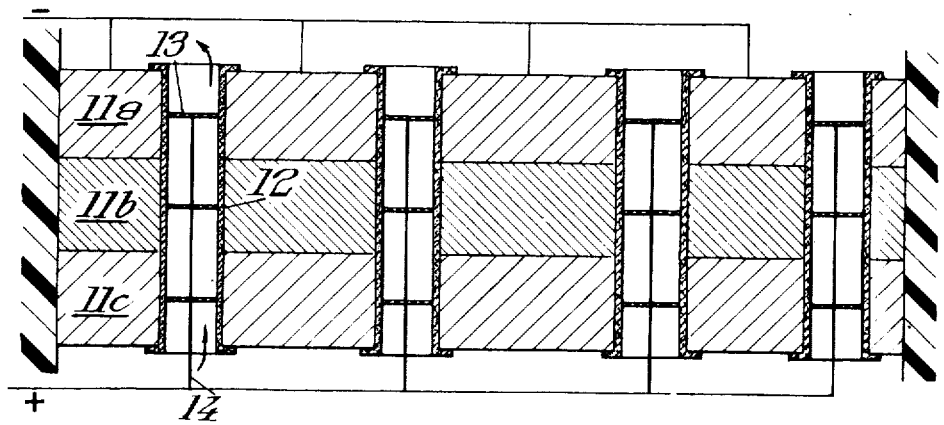
Figure 5:
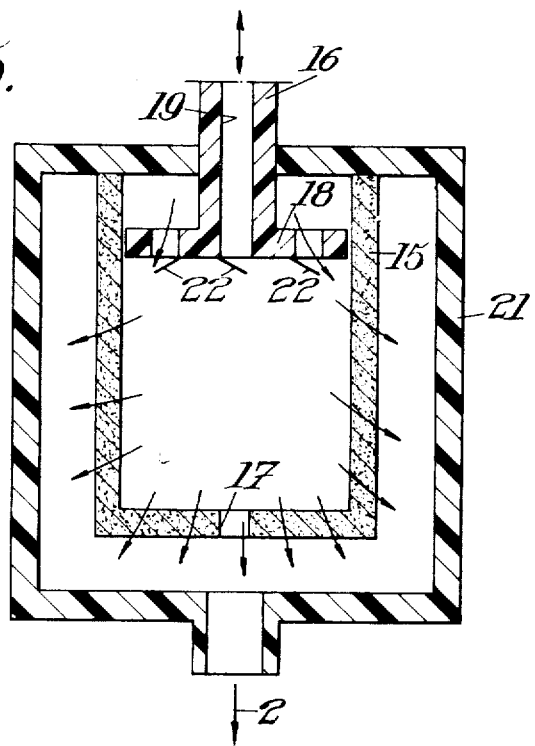

FIG. 4 shows, in partial section, a third embodiment of an electromechanical generator according to the invention, in which there is another variation in the arrangement of the electrodes in its midst; and FIG. 5 shows, in diagrammatic manner and in cross-section, an accessory member capable of being associated with an electrochemical generator according to the invention including at least one disperse electrode.

In order to facilitate the description of the preferred embodiments of an electrochemical generator according to the invention comprising the application of features of the invention and of which the positive electrode (or cathode) is dispersed, there will be considered the preferred embodiment wherein the electrolyte is constituted by a solution of potash and where the oxidizing or combustion supporting gas capable of being absorbed on this active carbon is constituted by oxygen.

Regarding firstly such an accumulator taken as a whole, it is arranged to include in known manner at least one compartment 1 inserted in a closed circuit 2 in which the circulation of the disperse electrode of active carbon is produced, for example by means of a pump 3, a collecting grid 4 of nickel being arranged in this compartment so as to be traversed by the suspension circulating in the latter. The particles are then adapted to be discharged, at the moment of their encounter with the collector, if the latter is connected with an external circuit of electrical current consumption.

According to the invention, the previous absorption of the oxygen on the carbon of the suspension is effected by making the latter circulate in contact with electrically conductive elements brought to a potential for discharge on these elements of $OH^-$ ions of the electrolyte. As has already been observed above, the electrolytic decomposition of the electrolyte is effected then preferentially on the carbon particles when the latter come in contact with the collector and are brought to the same potential as the latter, the oxygen formed in the course of this electrolysis being then almost wholly absorbed on the carbon. By prolonging this operation, the carbon dispersed in the electrolyte can then be "charged" with oxygen.

In a preferred embodiment of the electrolytic generator according to the invention, the electrically conductive elements intervening in the production of the charge are constituted by the collector 4 itself, the charged suspension then being adapted to participate in the later production of current, when the collector restored to its first function is inserted in a discharging circuit, and when there is effected, at the moment of its contact with carbon particles, the electrochemical conversion of the oxygen absorbed on the latter.

The assembly constituted by the compartment 1 and the circuit 2 then behaves like a true accumulator element which can be successively charged and discharged.

The invention makes possible the accumulation of very considerable amounts of oxygen on the carbon by electrolytic route, which has not been realisable efficiently up to this day, especially on known electrodes based on carbon. In fact, when these electrodes were constituted by an agglomerate of carbon consolidated by a binder, the gaseous discharge produced in the course of recharging led to dislocation of the electrode. In the case of non-consolidated electrodes, that is to say of which the grains were simply pressed on a collector, the gaseous release was produced especially over the latter and very little oxygen was absorbed on the carbon.

On the other hand, the present invention enables an accumulator element to be constituted comprising an electrode of which the catalyst is constituted by carbon and of which there can be applied enormous possibilities of the absorption of oxygen. In fact a carbon having, for example, a specific surface of 1,500 $m.^2/g.$ could theoretically, if its surface was almost entirely covered by the oxygen, absorb about 500 $cm.^3$ of oxygen per gram of carbon.

The actual amounts of oxygen capable of being absorbed by this route on carbon should be able to approach this value.

Figure 1:
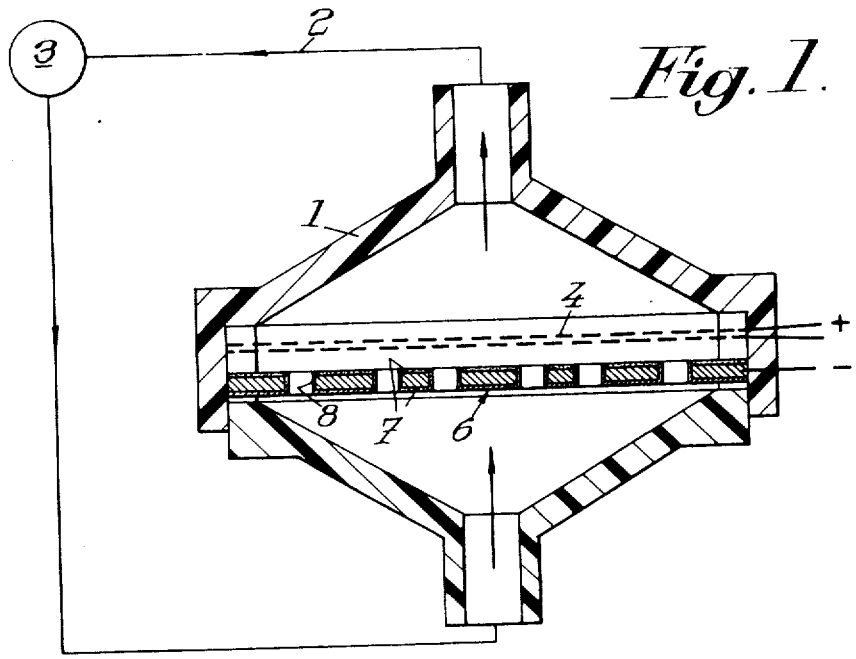
FIG. 1 shows diagrammatically a first embodiment of an electrochemical generator according to the invention.

By way of indication, it may be indicated here that there was obtained in the embodiment of FIG. 1, of which the anodic part will be described below, an absorption of 100 to 200 $cm.^3$ of oxygen per gram of carbon (measured by coulometry in the course of the subsequent discharge of the generator) under the following experimental conditions:

The carbon used had an average specific surface of 1,500 $m.^2/g.$ (carbon known commercially under the name Norit-Brx);

The disperse electrode was constituted by a suspension of 10 g. of this carbon in 300 $cm.^3$ of a 5 N aqueous solution of potash;

The charging was effected under a current of 2 amperes for a duration of two hours.

The yield of charge (also determined by coulometry) was of the order of 85%, which tends also to show that the major part of the oxygen formed by electrolysis was absorbed on the carbon of the suspension.

These 100 to 200 $cm.^3$ of oxygen absorbed by a gram of carbon correspond to a capacity per unit mass of 0.5 to 1 ampere/hour (ah.) per gram of carbon, which capacity is considerable if one takes into account that the capacity per unit mass of the best known accumulator electrodes based on nickel is of the order of 0.1 ah. per gram of electrode.

It is self-evident that the numerical data which have been given above by way of example are not in any way limiting and, in particular, that the experimental conditions described above do not constitute in any way the optimal recharging conditions. The quantities of oxygen capable of being absorbed on the carbon are capable of being considerably increased by the optimisation of the charging conditions and by the choice of the most favourable active carbons.

It goes without saying that the performances of accumulator elements thus constituted could again be improved if account is taken of other known factors coming into play in generators with disperse electrodes. For a given rate of discharge, the polarisation of the disperse electrode will be held at a value as reduced as possible, for which it is advantageous to use very efficient collectors (constituted for example by two grids or by two metal gauzes arranged superimposed) located across the flow of the suspension and having a number of large holes to increase the probability of contact between the particles of the suspension and these collectors, to provide the addition of a catalyst to the carbon, such as silver which, furthermore, enables the obtaining at an equal over-voltage of a much greater current density, etc.

Besides their very high capacity per unit mass, these electrodes can be recharged very rapidly, considering the absence especially of the mass transfer problems peculiar to solid electrodes of accumulators, in which the ions must be displaceable in the midst of their masses.

Although the anodic part associated in the generator with the cathodic compartment with a disperse electrode with oxygen accumulation, which has been described, may be of any type, recourse will advantageously be had to one or several compact accumulator elements 6 arranged in direct contact with the disperse electrode in the compartment 1 (these elements being completely immersible in the flow of the carbon suspension which circulates through this compartment), these compact elements being constituted of cores or of plates of rechargeable material of which the active surfaces are at least in part covered with a porous coating 7 adapted, on one hand, to enable the access of electrolyte to the said surfaces and the ionic conduction through the electrolyte in the midst of this porous material, on the other hand, to prevent the access of the particles of carbon to these active surfaces, those of the parts of these latter which are not covered by the porous coating being then, to the extent that they are immersed in the suspension, on the contrary covered with an insulating coating, especially an insulating varnish 8.

The rechargeable active material of the negative electrode may be constituted by any material used in conventional manner in the negative accumulator electrodes, preferably by cadmium, when the electrolyte is itself constituted by an alkaline base, especially potassium hydroxide.

Figure 2:
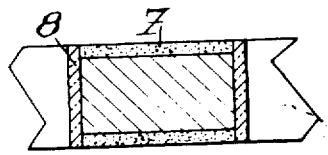
FIG. 2 shows a detail of the embodiment of FIG. 1.

The negative electrode has advantageously the shape of a plate pierced of holes, arranged in the compartment 1 parallel to the collecting grid 4, the opposite surfaces of the perforated cadmium plate being covered with the porous material enabling ionic conduction under the abovesaid conditions, the internal surfaces of the holes being themselves covered with the abovesaid insulating varnish (FIG. 2).

The abovesaid porous material may be constituted by any material enabling ionic conduction in the midst of the electrolyte soaking into its pores, the latter having a dimension however sufficiently small to prevent the access of particles of carbon onto the active surfaces of cadmium. An advantageous material for this purpose is constituted by porous polyvinyl chloride, especially that known in commerce under the trademark "Porvic."

As a result there is produced a complete cell of an electrochemical generator on the inside of a same compartment, this production being particularly advantageous in that the sealing partition which consitiuted it with regard to the suspension of separaors in known electrochemical generators working with at least one disperse electrode. The suspension is then adapted to traverse without notable overall deviation the plate constituting the negative electrode as well as the grid of the collector 4 on which are discharged the carbon particles containing oxygen in absorbed form, this absence of deviation also eliminating practically any risks of clogging the collector 4.

The use of negative electrodes of this type which must be rechargeable, enables a great variety of arrangements of constructions inside the electrochemical generator, all these constructions tending to reduce the bulk as well as the internal resistances of these generators.

Figure 3:
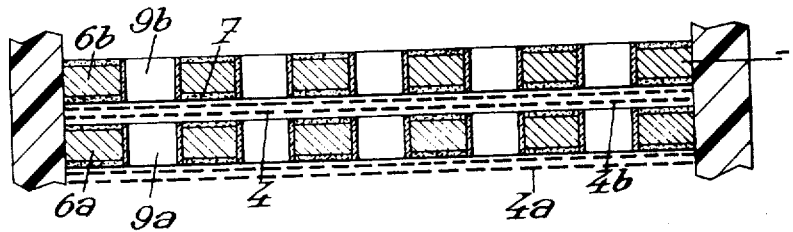
FIG. 3 shows, in partial section, another embodiment of an electrical generator according to the invention, including a variation of the arrangement of the electrodes in the midst of such a generator.

In a preferred embodiment of these generators, according to the invention, the negative electrode is constituted by a plurality of plates 6a, 6b . . . (FIG. 3) pierced with aligned holes 9a, 9b, and of which at least the opposite surfaces are covered with a porous coating under the abovesaid conditions, these plates being alternated with a series of collectors 4a, 4b . . ., capable of being traversed by the suspension which is then placed in circulation in the compartment through the holes in alignment 9a, 9b etc. By producing a true stack of these alternated plates and grids, there is obtained a much increased compactness, the ionic conduction then occurring in the midst of the porous coatings inserted between, on one hand, the compact active substance of the plates and, on the other hand, the grid 4a, 4b . . . of collectors.

Another advantageous arrangement of the electrodes in the compartment 1 of these generators is shown in FIG. 4. The negative compact electrode is constituted by a thick plate or by a stack of plates 11a, 11b, 11c . . . especially cadmium, pierced of holes which, in alignment, form channels of which the inner surfaces are covered with coatings, especially of porous tubes 12 having the above described characteristics, these channels providing passage to the suspension of the positive disperse electrode. The collector grids 13 which cooperate with this latter are then arranged in these channels transversely to the direction of flow of the suspension. The collector grids 13 arranged in a same channel are advantageously borne by one common axial conductor rod 14.

It is self-evident that the capacities per unit mass of the disperse positive electrode, on one hand, and of the compact electrode of opposite polarity, on the other hand, must be equal. The relative masses of the electrodes can be adjusted, for that which is the positive electrode for the quantity of carbon brought into play, and for that which is the negative electrode, especially by the number and the dimensions of the holes in the cadmium plates. In addition, account must be taken of the fact that the concentration of the carbon in the suspension cannot be, at least in the compartment 1, in excess of 300 grams per litre, so as to preserve the fluidity necessary for its suitability for circulation.

When the total capacity of the negative electrodes is great or in a general manner, when it is desirable to limit the total amount of electrolyte brought into action in the generator, with the object of reducing the weight of the later, recourse is advanageously had if necessary to a reservoir 15 of carbon inserted into the circulation circuit 2, preferably outside the compartment 1 and to means adapted, on one hand, to separate and to retain the carbon from the suspension subsequently to its passage in contact with the collector and, on the other hand, to introduce fresh carbon, provided from this reservoir into the electrolyte prior to passage of fresh suspension thus formed to contact the collector.

The means concerned include advantageously a device filtering at least partially the suspension at the input 16 of the reservoir, the carbon being then retained in the latter, and a branch circuit of filtered electrolyte communicating again with the circulating circuit 2 at the level of the discharge member 17 for fresh carbon from the reservoir 15.

According to a preferred embodiment of the generator according to the invention, the abovesaid reservoir 15 is constituted by a cylinder of porous material co-operating with a piston 18 actuated by oscillating movements and of which the rod is pierced by a channel 19 forming part of the circulating circuit 2, the abovesaid branch being constituted by an enclosure 21 surrounding the abovesaid reservoir and connected to the circulation circuit of the suspension downstream of the discharge member then constituted by a simple orifice provided in the bottom of the reservoir 15.

The piston 18 is equipped with valves 22 arranged so that they enable, in the course of the reascent of the piston, the entry of the suspension into the reservoir 15 through the channel 19 and, on descent of this piston, simultaneously, a discharge of carbon contained in the reservoir 15 and filtration of the electrolyte through the porous walls of this reservoir, the filtered electrolyte entraining fresh carbon discharged through the orifice 17 into the circuit 2.

This device hence enables the quantity of electrolyte to be limited to that necessary for the production of the abovesaid circulation, hence for a total amount of carbon brought into action, hence a given power to mass ratio, to reduce the weight of the generator.

The following comparison between the per unit mass properties of a conventional cadmium-nickel generator and of a cadmium-oxygen generator constructed according to the embodiment shown in FIG. 4 will enable, by way of non-limiting illustration, the remarkable performances of the generators according to the invention to be demonstrated.

The capacities per unit mass of the best known electrodes, there may be evaluated the weight of active parts ator are in particular the following:

cadmium plates: 3 ah./dm.$^2$, namely 3 ah./17.6 g. of plates;

plates of nickel: 2.60 ah./dm.², namely 2.60 ah./21.6 g. of plates.

Taking into account the necessity to "wet" the electrodes, theer may be evaluated the weight of active parts of a cadmium-nickel accumulator module of which the electrodes have 0.6 dm.² of apparent surface in the following manner:

| | G. |
|---|---|
| Weight of Cd | 10.5 |
| Weight of KOH in Cd | 1.1 |
| Weight of KOH in separator | 2.9 |
| Weight of Ni | 13.0 |
| Weight of KOH in Ni | 1.5 |
| Total | 29.0 |

The capacity per unit mass of this accumulator element being 1.55 ah., there results a capacity per unit mass of 53.5 ah./kg. and, especially at slow discharge rate (10 hours) a power per unit mass available of 64 watts/hour per kilogram (wh./kg.).

The weight of a cadmium-oxygen module, using for its cathodic portion collectors of expanded nickel (50 mg./cm.²), collector rods of nickel of a diameter of 1 mm. and cadmium plates pierced with channels 12 of which the cross-sections correspond to an apparent surface of 0.4 dm.²/dm.² of plate, and for its anodic portion a cadmium plate having an apparent surface of 0.6 dm.², may be evaluated as follows:

| | G. |
|---|---|
| Weight of Cd | 10.5 |
| Weight of KOH in Cd | 1.1 |
| Weight of KOH in holes | 3.7 |
| Weight of collectors | 2 |
| Weight of collector rods | 1.3 |
| Weight of carbon | 0.9 |
| Total | 19.5 |

The capacity per unit mass of this element is 1.8 am., namely 92.5 ah./kg. This module being capable of supplying electrical current under a potential difference of 1 volt, as a result at slow discharge rate (10 hours) the power available at its terminals is 92.5 wh./kg.

This available power which, in the example considered, is already distinctly greater than that of a cadmium-nickel generator, may be considerably increased by suitable adjustment of the charging conditions, of the choice of active carbon as a more favourable specific surface, of the arrangement of the compact electrodes, etc.

The abovesaid comparison has naturally been established on the active parts of the generators concerned. It is obvious that in the case of the cadmium-oxygen generator, the weight of auxiliary elements (pumps, circuit pipes 2, etc.) may be greater in the case of the cadmium-oxygen generator. The weight of these attachments is however less than 8% of the total weight for a generator having an available power of 1 k.w.h. and becomes negligible for generators having available powers greater than 2 k.w.h.

Aordingly, there are provided new accumulators (or elements of accumulators) having a very high capacity per unit mass relative to that which has been known in the state of the art and adapted, at least as regards the oxygen disperse electrode, to enable an extremely rapid discharge, hence the possibility of obtaining particularly intense currents.

What we claim is:

1. A metal-oxygen electrochemical generator comprising (1) a negative electrode and (2) rechargeable storage means including the positive electrode; said rechargeable storage means comprising a compartment filled with an aqueous electrolyte; electrically conductive consumable-metal eelments within said compartment; pulverulent active carbon suspended in said aqueous electrolyte and forming the active mass of said positive electrode; and means for circulating the suspension formed at the contact of said conducting elements; said apparatus further characterized in that said negative electrode is constituted by at least one compact element arranged in direct contact with the dispersed electrode within said compartment, said compact element being constituted by cores or plates of rechargeable material, whose active surfaces, non-insulated at least in part, are covered with a porous coating permitting access of the electrolyte to said surfaces and ionic conduction in the midst of its mass, but whose pores have dimensions such that they prevent said access by the particles of pulverulent material of the disperse electrode; said electrically conducting elements being connectible into an electric circuit, whereby upon applying a charging voltage to said electrical circuit, the oxygen formed in the storage means by the electrode decomposition of the aqueous electrolyte is adsorbed on the particles of the pulverulent active carbon contacting said conducting elements.

2. Electrochemical generator according to claim 1, wherein the electrolyte is an aqueous solution, the disperse electrode constitutes the positive electrode, and the cores or plates of the electrode of opposite sign are constituted by cadmium.

3. Electrochemical generator according to claim 2, wherein said cores or plates are covered in part by a coating of porous polyvinyl chloride whose pore dimensions are less than those of the particles of pulverulent material of the suspension, the remaining parts of the surface of said cores or plates being coated with an insulating varnish.

4. Electrochemical generator according to claim 1, wherein said electrically conductive elements are metallic grids.

5. Electrochemical generator according to claim 1, wherein said compact element arranged in direct contact with the disperse electrode is close to said current collector.

6. Electrochemical generator according to claim 1, wherein said rechargeable material is cadmium.

7. A rechargeable electrochemical generator which comprises a rechargeable electrode of one sign whose active mass is constituted by pulverulent active carbon dispersed in the midst of a liquid electrolyte to form a suspension, said suspension being adapted to be circulated in contact with a plurality of electrically conductive grids, the electrolyte being such that under the effect of a charging voltage applied to the conductive grids, it is adapted to provide, by electrolytic decomposition, a fuel gas or an oxidizing gas according to the sign of the said rechargeable electrode, and wherein the electrode of opposite sign is constituted by a plurality of compact plates, pierced with holes in alignment, in alternate arrangement with said grids and in direct contact with said suspension, said compact plates comprising cores of rechargeable material covered, at least on their opposite surfaces, with porous coatings permitting access of the electrolyte to said surfaces and ionic conduction in the midst of their mass, but whose pores have dimensions such that they prevent said access by the particles of pulverulent material of the suspension, and on their remaining surfaces with an insulating material.

8. Electrochemical generator according to claim 7, wherein said metallic grids are of nickel.

9. A rechargeable electrochemical generator which comprises a rechargeable electrode of one sign whose active mass is constituted by pulverulent active carbon dispersed in the midst of a liquid electrolyte to form a suspension, said suspension being adapted to be circulated in contact with a plurality of electrically conductive grids, the electrolyte being such that under the effect of a charging voltage applied to the conductive grids, it is adapted to provide by electrolytic decomposition, a fuel gas or an oxidizing gas according to the sign of the said rechargeable electrode, and wherein the eelctrode of opposite sign is constituted by a thick plate or by a stack of superposed plates pierced with holes providing passages for said suspension, the inner surfaces of said holes being covered with porous coatings permitting access of the electrolyte to said surfaces and ionic conduction in the midst of their mass, but whose pores have dimensions such that they prevent said access by the particles of pulverulent material of the suspension, and wherein the above said electrically conductive grids are arranged across the direction of circulation of said suspension and borne by conductive rods.

10. Electrochemical generator according to claim 9, wherein said grids and conductive rods are of nickel.

11. An electrochemical generator, comprising at least one electrochemical storage means having a rechargeable electrode whose active mass is constituted by pulverulent active carbon dispersed in the midst of a liquid electrolyte to form a suspension, said suspension being adapted to be circulated in contact with a plurality of electrically conductive grids, the electrolyte being such that under the effect of a charging voltage applied to the conductive grids, it is adapted to provide by electrolytic decomposition, a fuel gas or an oxidising gas according to the sign of the said rechargeable electrode, said electrochemical storage means further comprising:

a cylindrical reservoir for the pulverulent material in the form of a paste, in the circulation circuit of said suspension, outside the zone in which the electrochemical conversion occurs, a piston adopted to be driven with oscillating movements within said cylindrical reservoir, said piston being pierced by a channel forming part of said circulating circuit upstream from the portion of said reservoir which contains said paste, said reservoir being formed of a porous material allowing for a partial filtration of the electrolyte through its walls and including a discharge member of fresh pulverulent material at its end opposite said piston, and an enclosure surrounding said reservoir and connected downstream of said discharge member to the circulation circuit of the suspension.

References Cited

UNITED STATES PATENTS

| | | | |
|---|---|---|---|
| 2,384,463 | 9/1945 | Gunn et al. | 136—86 R |
| 3,216,861 | 11/1965 | Cohn et al. | 136—86 R |
| 3,311,505 | 3/1967 | Paget et al. | 136—86 D |
| 3,317,349 | 5/1967 | Elliott et al. | 136—86 S |

ALLEN B. CURTIS, Primary Examiner